United States Patent [19]

Piske et al.

[11] Patent Number: 5,331,395
[45] Date of Patent: Jul. 19, 1994

[54] DEVICE FOR ALIGNING A LASER LEVELING INSTRUMENT ALONG A BUILDING LINE

[75] Inventors: Wilfried Piske, Heerbrugg; Martin Koeppel, Widnau, both of Switzerland

[73] Assignee: Leica Heerbrugg AG, Herbrugg, Switzerland

[21] Appl. No.: 958,220

[22] Filed: Oct. 9, 1992

[30] Foreign Application Priority Data

Oct. 9, 1991 [DE] Fed. Rep. of Germany ....... 4133381

[51] Int. Cl.$^5$ .............................................. G01C 5/00
[52] U.S. Cl. ............................. 356/138; 33/DIG. 21; 359/834
[58] Field of Search ............... 356/138, 147, 399, 400; 33/DIG. 21; 359/831, 834

[56] References Cited

U.S. PATENT DOCUMENTS

| | | | |
|---|---|---|---|
| 4,912,851 | 4/1990 | Rando et al. | 356/138 |
| 4,988,192 | 1/1991 | Knittel | 356/138 |
| 5,144,486 | 9/1992 | Hart | 356/138 |
| 5,144,487 | 9/1992 | Hersey | 356/138 |

FOREIGN PATENT DOCUMENTS

| | | |
|---|---|---|
| 2446800 | 9/1975 | Fed. Rep. of Germany . |
| 2607280 | 9/1977 | Fed. Rep. of Germany . |
| 3827459 | 2/1990 | Fed. Rep. of Germany . |
| 674573  | 6/1990 | Switzerland . |

*Primary Examiner*—F. L. Evans
*Attorney, Agent, or Firm*—Foley & Lardner

[57] ABSTRACT

An apparatus for aligning a laser leveling instrument along a building line can remain standing unchanged on its base throughout both horizontal and vertical leveling operations. The light source is located in the base of the instrument. The instrument head can be swung through 90° and houses a rotating prism which generates the vertical plane, and an adaptor. The adaptor includes a prism for deflecting the light from the source into the rotating prism and a triple prism which, when brought into the light path, deflects the light coming from the base perpendicular to the generated vertical plane, projecting it onto the building line.

10 Claims, 3 Drawing Sheets

DEVICE FOR ALIGNING A LASER LEVELING INSTRUMENT ALONG A BUILDING LINE

BACKGROUND OF THE INVENTION

The invention relates to a laser leveling instrument in which vertical and horizontal alignment with a building line may be performed while keeping the base of the instrument in the same position.

Laser leveling instruments emit a horizontal or vertical rotating measurement beam which is detected by a photoelectric receiver. The rotating laser beam defines a reference plane in this case. As soon as the receiver is located in the reference plane, the receiver indicates this by optical and/or acoustic signals.

Such laser leveling instruments can also be used with a laser beam wavelength in the visible region, so that the projected horizontal or vertical plane is visible without additional means.

A laser leveling instrument which optionally emits a horizontally or vertically rotating measurement beam and, in doing so, generates a horizontal or vertical reference plane is disclosed in CH-PS 674,573. Arranged in its base and on its vertical spindle, this leveling instrument has a laser whose beam is guided via a rotating deflecting prism arranged in the leveling instrument head. A horizontal reference plane is generated in this case. In this known laser leveling instrument, the leveling instrument head can, moreover, be swung down at right angles from the base. The laser beam emerging from the base is deflected onto the rotating prism via an additional adaptor having a fixed prism. In this case, a vertical reference plane is generated.

Such vertical reference planes are principally employed in the use of the leveling instrument in the building industry to align wall elements, facade structures or the like. These tasks can be accomplished by means of the laser leveling instrument in the above-mentioned CH-PS 674,573.

Moreover, there are also applications of such a laser leveling instrument in which this vertical reference plane has to be aligned at right angles to an existing wall or along a building line. This can be the case, for example, if the aim is to subdivide a room into individual rooms by means of wall elements. Such tasks can be accomplished with the aide of the laser leveling instrument from CH-PS 674,573 only in a time-consuming, and thus troublesome fashion.

SUMMARY OF THE INVENTION

It is therefore an object of the present invention to provide an improved laser leveling instrument. It is also an object to provide a laser leveling instrument which permits vertical reference planes also to be aligned on a building line arranged perpendicular thereto with the aid of a simple device.

In accomplishing the foregoing objects, there has been provided according to the invention a device for aligning a laser leveling instrument along a building line including: an instrument base; a laser light source arranged in the instrument base outputting a laser beam; an instrument head which can be swung through 90° and has arranged therein a rotating prism for generating a vertical plane and an adaptor having a prism for deflecting the laser beam from the base onto the rotating prism in the instrument head. The adaptor additionally has a triple prism which can be brought into a path of the laser beam and deflect the laser beam coming from the base perpendicular to the generated vertical plane and project it onto the building line.

It is possible throughout these measurements for the leveling instrument to remain standing on its base during the entire measurement operation, i.e., on a pedestal or a stand in a manner unchanged both for horizontal and for vertical leveling operations. It is also possible for the vertical plane to be aligned at right angles to a building line. In the construction industry, a right angle can be laid off in a particularly simple fashion using such an arrangement.

BRIEF DESCRIPTION OF THE DRAWINGS

The invention will be described in further detail with reference to the accompanying drawings, wherein.

DETAILED DESCRIPTION OF THE PREFERRED EMBODIMENTS

Figure 1:
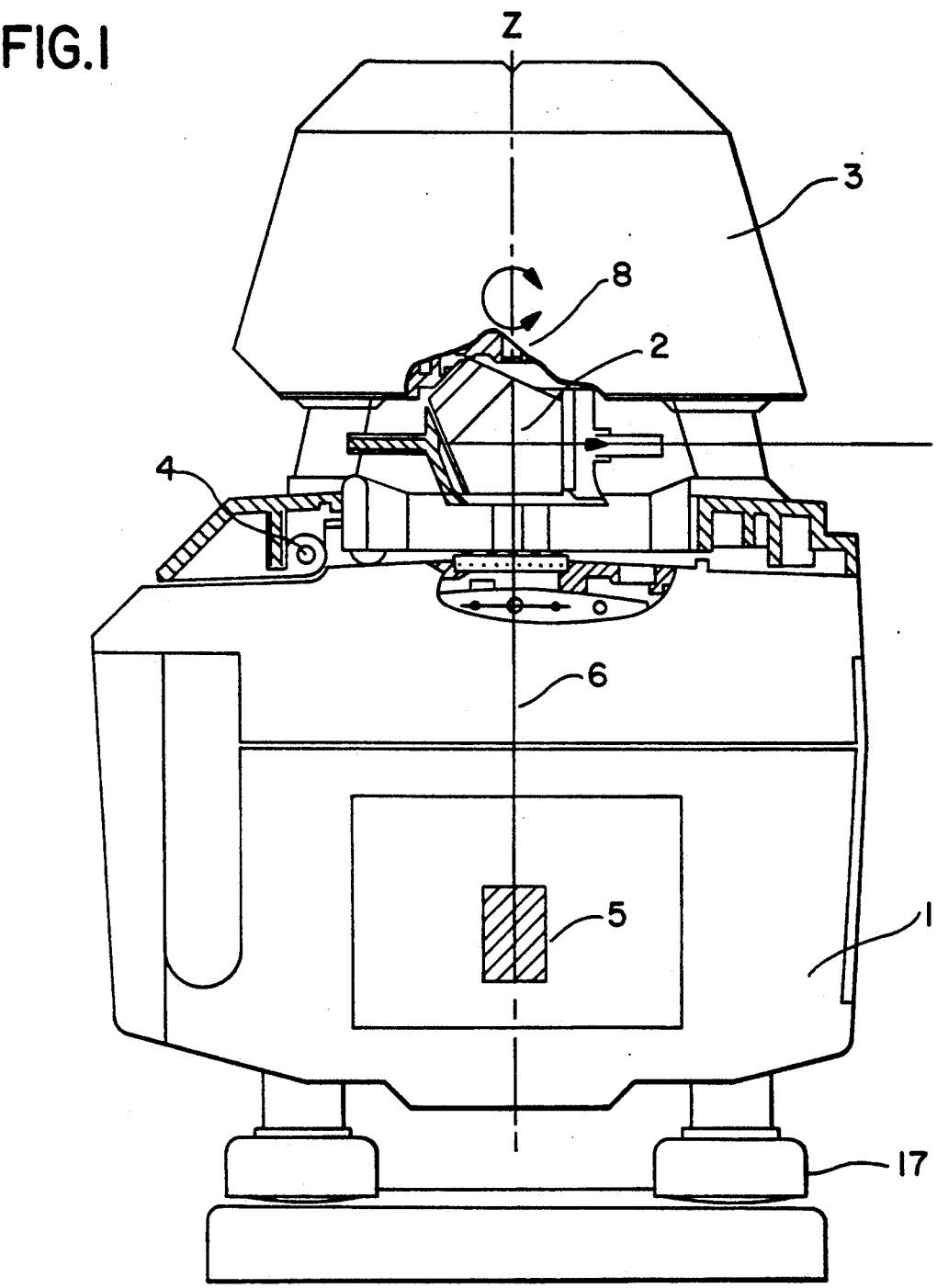
FIG. 1 shows the laser leveling instrument for horizontal leveling.

FIG. 1 shows a laser leveling instrument having a base 1 and an instrument head 3. The laser leveling instrument is mounted on a tripod 17 for the purpose of vertically aligning the entire instrument over a definite ground point. A collimated laser light source 5, vertically outputting a laser beam 6, is located in the base 1 of the instrument, that is to say a laser beam extending along the Z-axis is provided. This laser beam 6 is converted by a motor-driven pentaprism 2 rotating above the Z-axis, as shown by the arrow, into a rotating beam which thereby defines a horizontal reference plane. The motor drive 8 for the prism 2 is located in the instrument head 3. The instrument head 3 is joined to the base 1 via a hinge 4.

Figure 2:
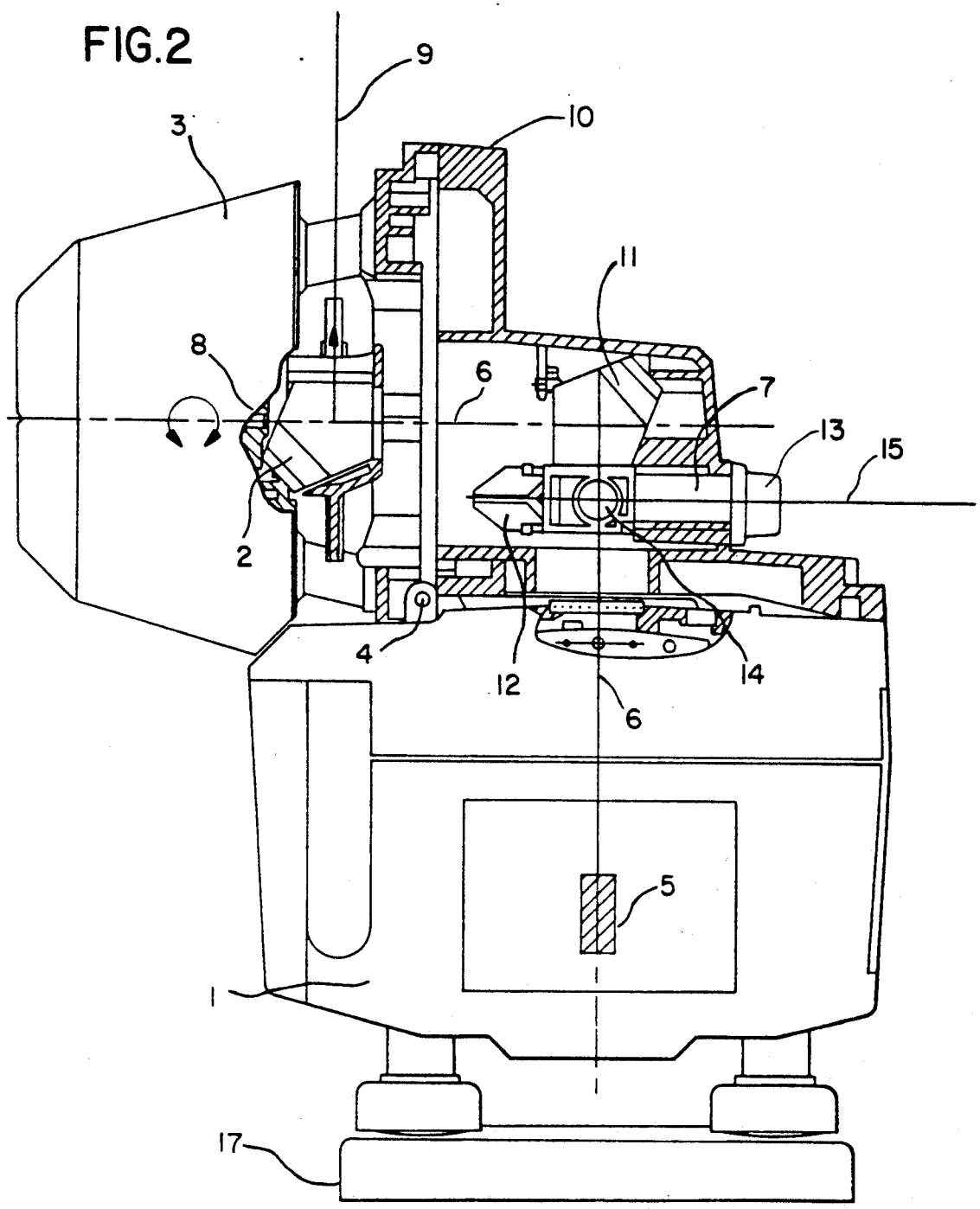
FIG. 2 shows the same instrument with head swiveled through 90 degrees and an attached adaptor used for vertical leveling.

FIG. 2 shows the same instrument in which the head 3 is swiveled by 90° about the hinge 4. In this case, the axis of rotation of the rotating prism 2 is no longer located along the Z-axis, but offset by 90°, as shown by the double arrow. The laser beam 6 emerging vertically from the base 1 of the instrument is deflected by an attached adaptor 10 onto the rotating prism 2 in the instrument head 3. The adaptor 10 is equipped for this purpose with a deflecting prism 11 having a deflecting angle of 90°. The instrument is suitable in this configuration for marking a vertical reference plane 9. The adaptor 10 further has a rotatably supported spindle 7 on one end of which a triple prism 12 is arranged. Provided at the other end of this spindle 7 is a rotary lever 13 which allows the spindle 7 to be rotated by 90° and thus the triple prism 12 can be brought into its operating position behind the deflecting prism 11. For the purpose of unimpeded passage of light for both positions of the triple prism 12, the spindle 7 has four boreholes 14 arranged at 90° in each case.

Figure 3:
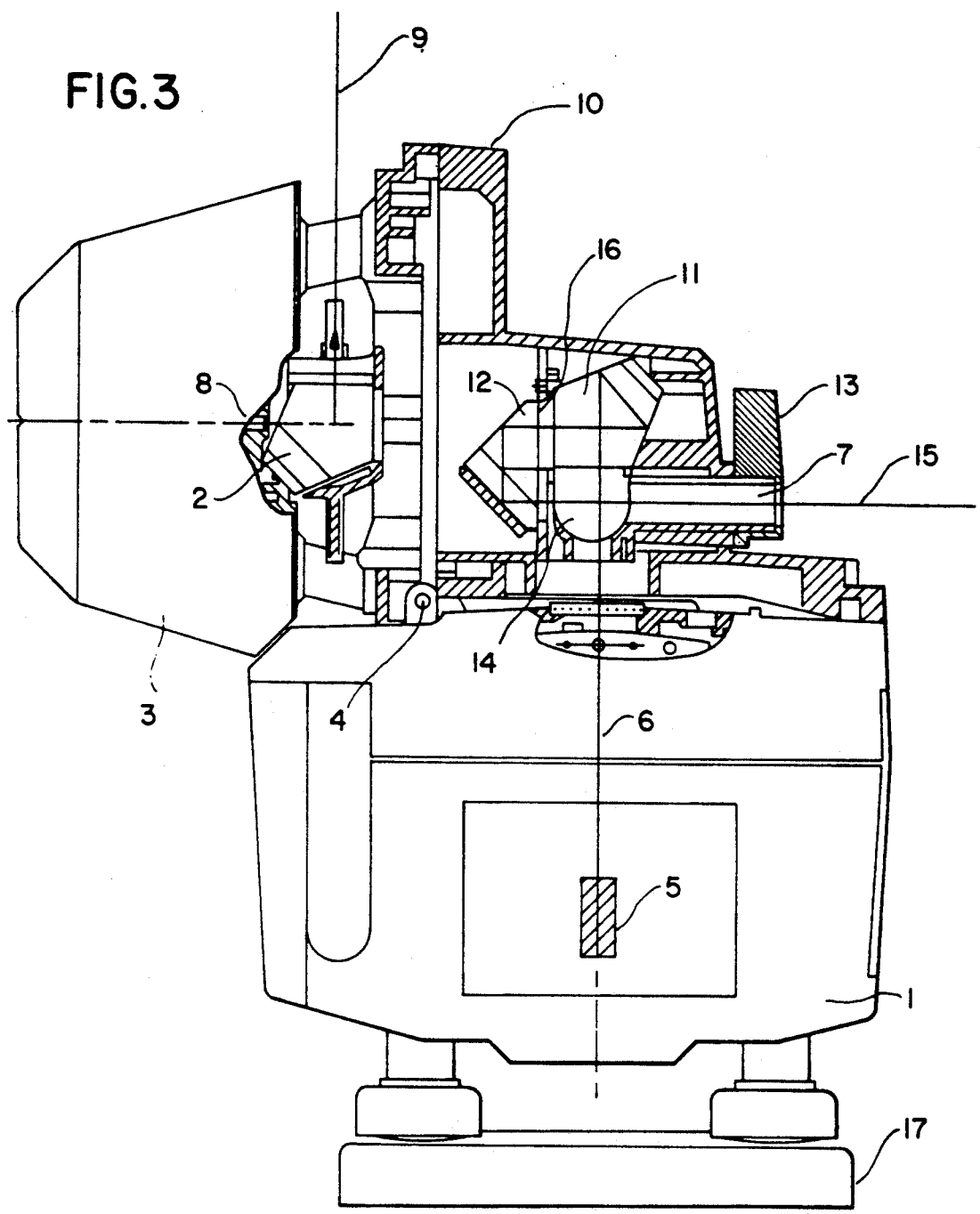
FIG. 3 shows the laser leveling instrument in accordance with FIG. 2 with a triple prism in the beam path.

FIG. 3 shows the instrument in accordance with FIG. 2 with the triple prism 12 brought into operating position. The laser beam 6 emanating from the laser diode 5 is deflected by the deflecting prism 11 into the swiveled-in triple prism 12. There, the beam 6 is displaced parallel and reflected through the spindle 7, which is constructed with a hollow interior. As a result, the laser beam 6 is deflected perpendicularly to the vertical reference plane 9 and emerges from the laser leveling instrument at right angles to the vertical reference plane 9 (compare with FIG. 2). The laser leveling instrument is now aligned with this building line 15 onto a prescribed line or prescribed points. The triple prism 12 is swiveled out of the beam path 6 by renewed throwing of the rotary lever 13. The laser beam 6 now once again impinges on the rotating prism 2 and generates a vertical reference plane 9 perpendicular to the building line 15.

It has proven to be advantageous to employ a laser diode which emits light in the visible region. It is, of course, also possible to use infrared laser diodes. A suitable receiver has to be placed in the output beam path for this purpose.

Depending on the output power of the laser diode 5, it may be necessary to limit the wavelength of the emerging laser light. A blocking layer 16 which absorbs or reflects wavelengths beyond 700 nm is provided on the triple prism 12 for this purpose. This blocking layer 16 can, of course, also be provided on the deflecting prism 11.

All the exemplary embodiments represent and describe prisms. However, the latter can also be replaced with mirrors without this limiting the function of the described laser leveling instrument. For example, in one embodiment triple prism 12 in FIG. 2 and FIG. 3 may be replaced with a triple mirror.

Other designs within the spirit and scope of the invention will be apparent to those skilled in the field after receiving the above teachings. The invention, therefore, is defined with reference to the following claims.

What is claimed is:

1. A device for aligning a laser leveling instrument along a building line comprising:
   an instrument base;
   a laser light source, arranged in said instrument base, outputting a laser beam; and
   an instrument head tiltable by 90° and has arranged therein;
   a rotating prism for generating a vertical plane when said head is tilted, and
   an adaptor for use when said head is tilted having a prism positioned in a path of said laser beam between said light source and said rotating prism for deflecting said laser beam from said base onto said rotating prism in said instrument head, wherein said adaptor additionally has a triple reflector selectively brought into said path of said laser beam and to deflect said laser beam coming from said base in a direction perpendicular to said generated vertical plane to project it onto said building line.

2. The device as claimed in claim 1, wherein said triple reflector is a triple prism.

3. The device for aligning a laser leveling instrument as claimed in claim 2, wherein said triple prism is mounted on a rotatably supported spindle and can be brought via a rotary lever into said path of said laser beam between said prism and said rotating prism.

4. The device for aligning a laser leveling instrument as claimed in claim 3, wherein said spindle is arranged perpendicular to the laser beam coming from said base and is hollow.

5. The device for aligning a laser leveling instrument as claimed in claim 4, wherein the projection along said building line is provided via said prism arranged in said adaptor, said triple prism and through said spindle.

6. The device for aligning a laser leveling instrument as claimed in claim 1, wherein said triple reflector has a blacking layer for absorbing or reflecting light beyond 700 nm.

7. The device for aligning a laser leveling instrument as claimed in claim 1, wherein said triple reflector is a triple mirror.

8. A method for leveling an instrument along a building line, comprising the steps of:
   generating, via a light source, a collimated light beam in a base of said instrument along an axis;
   redirecting said light beam along a path orthogonal to said axis via a rotating prism in a head of said instrument;
   aligning said orthogonal beam path with said building line;
   swiveling said head by 90° so that said rotating prism is offset by 90°;
   passing said light beam through said rotating prism thereby generating a vertical reference plane;
   positioning a triple prism in a path of said light beam between said light source and said rotating prism while said head is rotated by 90°;
   reflecting said light beam output from said triple prism through a hollow spindle; and
   outputting said light beam from said instrument orthogonal to said vertical reference plane.

9. A leveling device, comprising:
   a light source outputting a light beam along a beam path;
   a rotating prism positioned in said beam path, said rotating prism generating a vertical light plane when said light beam is incident upon said rotating prism; and
   an adapter positioned in said beam path between said light source and said rotating prism, said adapter having a first position and a second position; wherein
   said light beam passes through said adapter and is incident upon said rotating prism which generates said vertical light plane when said adapter is in said first position; and
   said light beam is deflected by said adapter in a direction perpendicular to said vertical light plane as a reference light beam when said adapter is in said second position.

10. A leveling device as recited in claim 9, wherein said adapter is removable from said beam path, and said leveling device further comprises means for tilting said rotating prism by 90° to an upright position when said adapter is removed to generate a horizontal light plane.

* * * * *